Feb. 14, 1961 V. W. WEEKMAN, JR 2,971,900

HYDROCRACKING OF HYDROCARBONS

Filed Oct. 17, 1958 3 Sheets-Sheet 1

INVENTOR
Vern W. Weekman
BY
Andrew L. Gabriault
ATTORNEY

INVENTOR
Vern W. Weekman
BY
Andrew L. Gaboriault
ATTORNEY

Feb. 14, 1961 V. W. WEEKMAN, JR 2,971,900

HYDROCRACKING OF HYDROCARBONS

Filed Oct. 17, 1958 3 Sheets-Sheet 3

INVENTOR
Vern W. Weekman
BY
Andrew L. Gaboriault
ATTORNEY 2,971,900
Patented Feb. 14, 1961

2,971,900

HYDROCRACKING OF HYDROCARBONS

Vern W. Weekman, Jr., Woodbury, N.J., assignor to Socony Mobil Oil Company, Inc., a corporation of New York Filed Oct. 17, 1958, Ser. No. 767,923

4 Claims. (Cl. 208—59)

This invention deals with the catalytic conversion of hydrocarbons, in the presence of hydrogen, into more desirable hydrocarbon products, especially gasoline and fuel oil. More particularly, it relates to a technique for the conducting of such reactions so as to prolong the productive life of the catalyst between regenerations.

This invention will be best understood by referring to the attached drawings, of which:

In conventional hydrocracking operations a fixed bed of solid hydrocracking catalyst, made up of one or more components which promote hydrogenation and one or more components which promote cracking, is maintained within an enclosed reaction zone. The hydrocarbon charge is heated to about the desired reaction temperature and passed over the catalyst. The reaction is normally exothermic so that the reactor effluent will be at a higher temperature than the charge. The reaction deposits carbonaceous contaminant or coke on the catalyst which builds up over the course of time and eventually must be removed, usually by burning.

Figure 1:
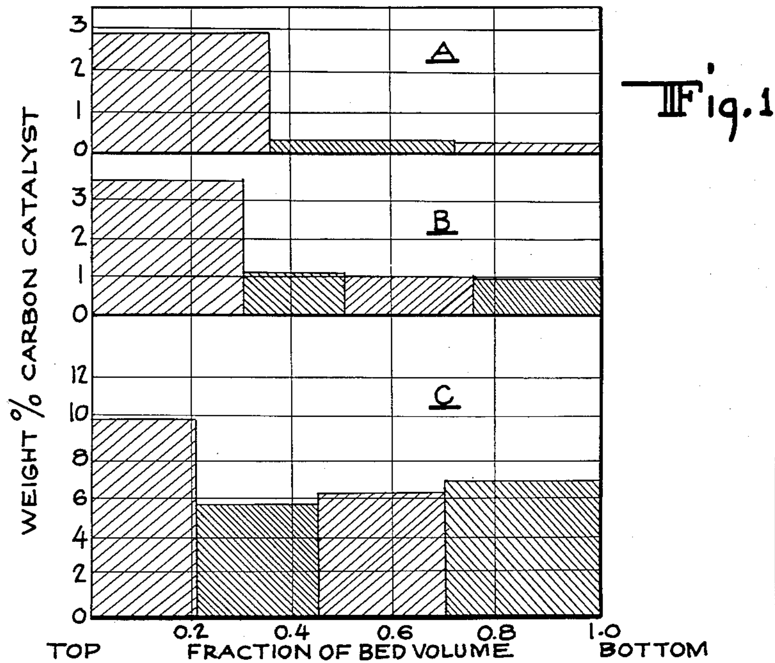
Figure 1 is a graph showing the variation in carbon deposits through conventional hydrocracking reaction beds.

The prior art has indicated that in this type of hydrocracking operation the coke deposition on the catalyst in the reaction bed over the course of time is uneven. It has been demonstrated that the upper third, or sometimes as much as the upper half, of the reaction bed will bear an amount of carbonaceous contaminant substantially greater than the remainder of the bed. This phenomenon is illustrated in Figure 1. There the carbonaceous deposit, as weight percent carbon on the catalyst, is plotted against the depth of the catalyst in the reaction bed, as the fraction of the bed depth from the inlet end thereof.

The graph marked "A" is based on data obtained from the isothermal bench scale operation of a hydrocracker employing a light gas oil charge and a platinum on silica-alumina catalyst at 1000 pounds per square inch pressure and a space velocity of 0.5 volume of charge (measured as 60° F. liquid) per volume of catalyst per hour.

The data for graph B were obtained in an isothermal bench scale hydrocracking operation at about 810° F. The charge was a heavy gas oil boiling above 650° F. and the catalyst was composed of the oxides of silicon, aluminum, molybdenum and cobalt. The reaction was conducted at 2000 pounds per square inch pressure and a space velocity of one volume of reactant per volume of catalyst per hour.

The data for graph C were obtained from an adiabatic pilot plant hydrocracking operation at 1500 pounds per square inch pressure. During this operation the temperature varied from 790° F. to 870° F. The charge stock was a gas oil boiling above 400° F. and the catalyst consisted of the oxides of silicon, aluminum, molybdenum and cobalt.

The graphs of Figure 1 make clear that the catalyst in the upper portion of the reaction bed bears an amount of carbonaceous contaminant substantially greater than that borne by catalyst in the remainder of the bed.

Obviously, in this situation, the initial portion of the reaction bed will become ineffective for practicing the desired hydrocracking process much more rapidly than the remainder of the bed. When the upper portion becomes ineffective, the portion nextbelow operates as the inlet portion and the high coke laydown occurs there. Thus, this high coking area may proceed through the entire bed.

Under conventional practice the reaction temperature is increased to compensate for declining catalyst activity. However, this temperature cannot be increased indefinitely since the charge will undergo thermal conversion if its temperature is raised too high. Therefore, when the activity level of the catalyst is reduced by deposits of carbonaceous contaminant to some predetermined level, the entire unit must be shut down in order to regenerate the catalyst. Obviously the heavy coke laydown in the initial portion of the reaction bed accelerates the need for a shutdown.

The prior art has suggested that it would be desirable if the upper half or third of the reaction bed were contained in a separate vessel so that only this heavily contaminated catalyst would have to be regenerated frequently, with the remainder of the bed which becomes contaminated less rapidly being regenerated less frequently. While this procedure undoubtedly would have certain economical advantages over the more conventional operation, it does not strike at the heart of this problem. It would be much more desirable to develop a technique by which the catalyst was contaminated at a uniform, low level in the first place. Such an operation is the subject of this invention.

It is well-known that two basic reactions occur in a hydrocracking operation, cracking and hydrogenation. The catalysts customarily employed will contain one or more components which catalyze the hydrogenation reaction and another one or more components which catalyze the cracking reaction. Each reaction proceeds at a measurable rate and, in the usual practice, the rates of these two reactions are in balance so that the over-all reaction achieves conversion of the reactant to the desired products with a suitably low deposition of carbonaceous contaminant on the catalyst.

It is my theory that the substantially higher coke deposits in the initial section of the hydrocracking bed result from the following sequence of reactions: Where the same catalyst is used throughout the length of the bed and the bed is kept under substantially the same reaction conditions throughout, there will be a tendency for nitrogen sulfur and oxygen compounds and olefins in the fresh charge to hydrogenate very rapidly upon first entering the reaction zone. At this first stage the hydrogenation reaction proceeds more rapidly relative to the cracking reaction than is the case in the main body of the reaction bed. Hydrogenation being highly exothermic, there is a substantial quantity of heat released in this initial stage. This heat then causes the cracking rate to accelerate, and in a second stage, after the initial hydrogenation is completed, the cracking rate will proceed more rapidly relative to the hydrogenation rate than is desirable. The accelerated cracking of the hydrocarbons will produce substantial quantities of unsaturates which will not be hydrogenated at the hydrogenation rate in this stage. These unsaturates, therefore, polymerize into carbonaceous contaminants or coke which contaminates the catalyst. After a period of this high rate of cracking, the temperature of the reactant will drop because of the endothermic nature of the cracking reaction and the cracking rate and hydrogenation rate will then be in balance and will remain in balance in the expected manner throughout the remainder of the bed.

Figure 2:
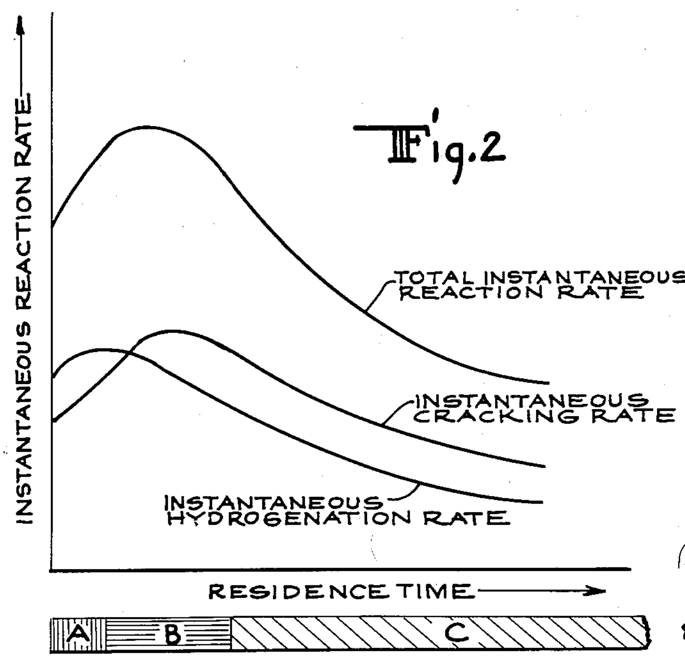
Figure 2 is a graph of instantaneous reaction rates within a conventional hydrocracking reaction bed plotted against residence time of the reactant in the bed.

This may be illustrated by reference to Figure 2, which plots the instantaneous reaction rate against residence time in the reaction bed. Of course, for conventional beds of uniform cross-sectional area the residence time will be directly proportional to the level within the catalyst bed below the inlet end. The upper curve is a plot of the total instantaneous reaction rate. It goes through a peak in the initial stages of the reaction. The instantaneous hydrogenation rate, it is noted, is much higher than the instantaneous cracking rate in the early stages of the reaction. However, shortly thereafter, the cracking rate accelerates rapidly while the hydrogenation rate begins to decline. Finally, after a period, the cracking rate and hydrogenation rate are in balance, as denoted by the constant distance between the two curves. The bar graph at the bottom of Figure 2 illustrates the three separate zones within the reaction bed when the same catalyst and reaction conditions are employed throughout the bed. The first zone is the zone of rapid hydrogenation. This is followed by a zone in which the cracking reaction predominates and the final zone is one in which cracking and hydrogenation reactions are in balance. This last zone is the one that operates in the manner intended by conventional designs. It will normally take up the major portion of the residence time, usually at least a half, and more frequently about two-thirds, of the residence time.

It is a major object of this invention to lengthen the period between required regenerations in catalytic hydrocracking processes.

Another object of this invention is to provide a fixed bed, catalytic hydrocracking process in which the deposition of carbonaceous contaminant is at a uniformly low level throughout the length of the bed.

Another object of this invention is to provide a fixed bed, catalytic hydrocracking process in which the deposition of carbonaceous contaminant on the catalyst is minimal.

These and other objects of the invention will be apparent from the following discussion of the invention.

Broadly, in this invention, a reactant is passed under hydrocracking conditions through a plurality of zones connected in series. These zones are so sized that at least one-half of the total reaction time is spent in the last zone. Reaction conditions are maintained in the zone preceding the last zone which are relatively more favorable to hydrogenation and less favorable to cracking than the conditions in the last zone.

The term "reaction conditions," as used herein, includes not only the conventional process conditions, such as hydrogen pressure and temperature, but also such factors as catalyst type and catalyst size and any other condition which will affect the hydrogenation rate relative to the cracking rate.

Obviously, the process outlined above, by depressing the tendency toward cracking and increasing the tendency toward hydrogenation, works against the observed tendency in this zone toward overcracking and promotes rapid hydrogenaiton of any cracked products, thereby tending to reduce the high coke make which occurs in this region in conventional operations.

Figure 3:
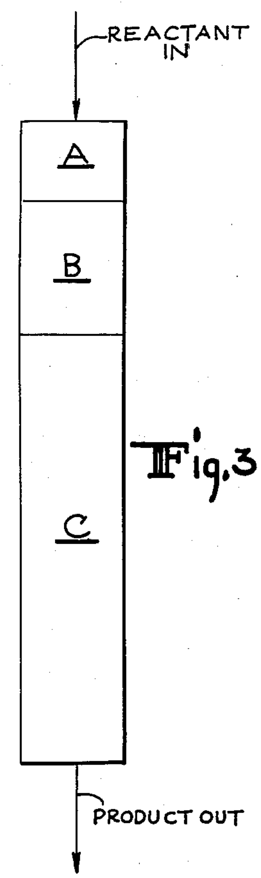
Figure 3 is a diagrammatic illustration of a hydrocracking reaction bed divided into three zones in accordance with this invention.

The broad process of this invention may be accomplished in a variety of different ways. One such technique is to provide three different zones in the reaction bed with different catalysts in each zone. Referring to Figure 3, zone C would contain the standard hydrocracking catalyst selected for general use in the reaction. The temperature of the charge and the pressure in the entire reaction zone would be selected to obtain the desired degree of conversion at a tolerable degree of coke deposition as though this catalyst filled the entire reaction zone. Zone C should be of a size such that at least one-half of the residence time of the charge in the total reaction zone occurs in this zone. Generally, the charge should use up at least two-thirds of its total residence time in zone C.

Zone B is the zone critical to this invention. In zone B a catalyst could be used which has a higher ratio of hydrogenation activity to cracking activity than the same ratio for the catalyst used in zone C. This catalyst may be selected from among the many catalysts known to the art. It may be compared to the catalyst in zone C by routine measurement of the hydrogenation activities and cracking activities of the two catalysts in the manner well-known in the art. For example, hydrogenation activity may be measured as follows:

A standard 400° F. to 700° F. gas oil may be passed over the catalysts under test at identical operating conditions, for example, 750° F. reactant inlet temperature, a space velocity of one volume of reactant (measured as 60° F. liquid) per volume of catalyst per hour, a reactor hydrogen pressure of 1500 pounds per square inch gauge and a hydrogen circulation to the reactor of 5000 standard cubic feet of hydrogen per barrel of retactant. A 400° F. to 650° F. fraction would then be removed from each reactor effluent and the aniline point (A.S.T.M. test 611–53T) and A.P.I. gravity (A.S.T.M. test D287–54) of the fraction determined. The diesel index may then be calculated for each fraction as the product of the aniline point and A.P.I. gravity divided by 100. The higher the diesel index, the greater the hydrogenation activity of the catalyst.

The cracking activity of catalysts may be determined by passing a straight run paraffinic gas oil, boiling between 400° F. and 700° F., over the catalysts under test. The same operating conditions as those employed in the hydrogenation test may be used except that a higher temperature of 830° F. would be employed. The volume of material in the product which boils below 400° F. is measured. The greater this volume, the greater the cracking activity.

It is not the most desirable procedure to keep stocks of two different catalysts on hand. As a part of this invention it has been discovered that the invention may be practiced when only one catalyst composition is available. In fixed bed operations it is most desirable that catalyst of relatively large particles be employed. Catalyst which is too small will impose an unduly high pressure drop across the reaction bed. A typical catalyst might be made up of ⅛ by $\frac{1}{16}$ inch pellets. It has been discovered, however, that if a catalyst of such size is ground, for example, 42 to 48 mesh Tyler, its hydrogenation activity is improved relative to its cracking activity. It is believed that with most conventional hydrocracking catalysts, the hydrogenation reaction rate at the temperatures customarily used, is limited by the inability of reactants to diffuse into the catalyst to the sites which promote hydrogenation while the cracking reaction rate is not limited to as great an extent. Thus, the grinding improves the ability of the reactants to diffuse to the hydrogenation sites relative to the improvement in the cracking rate.

The difference between pelleted and ground catalyst is illustrated by the data in Table I below. These data are for the hydrocracking of an 800° F. to tar cut of West Texas Gas Oil. The oil inlet temperature was varied to maintain the quantity of cracked material boiling below 650° F. at about 70 volumes percent of the charge. The hydrogen circulation was 14,500 standard cubic feet per barrel of charge. The catalyst was a composite of cobalt and molybdenum oxides, silica and alumina in about the following weight percentages, CoO—2.5%, $MoO_3$—8%, $SiO_2$—15% and $Al_2O_3$—74.5%.

TABLE I

| | | | |
|---|---|---|---|
| Liquid Space Velocity, Volume of charge per volume of catalyst per hour | 0.5 | 1.0 | 4.0 |
| Pressure—pounds per square inch | 1,500 | 1,500 | 3,000 |
| Aging Rate—° F. per day: | | | |
| ⅛ x 1/16 inch pelleted catalyst | 2.5 | 9.1 | 2.3 |
| 42–48 mesh crushed catalyst | 2.5 | 4.6 | 1.4 |

The aging rate in the above table is measured as the rate at which the oil inlet temperature must be increased in ° F. per day over the course of time, to maintain the degree of conversion at the specified level (70 percent). The term "degree of conversion" as used herein means the volume percent of the material in the product which boils below 650° F. at atmospheric pressure.

It will be noted that Table I indicates that at higher space velocities the aging rate is considerably lower in the catalyst of smaller particle size. At higher space velocities and constant conversions the total instantaneous reaction rate is higher than at lower space velocities. This accentuates the imbalance of cracking and hydrogenation rates over the imbalance at lower space velocities and the better performance of the crushed, smaller size catalyst in suppressing this imbalance is demonstrated by its lower aging rate.

Returning to Figure 3, zone A is the zone of rapid hydrogenation where uniform conditions obtain throughout the bed. Rapid hydrogenation will occur in zone A where any one of the following components is present in the charge stock in at least the indicated quantity:

| | |
|---|---|
| Nitrogen | 0.05% by weight. |
| Sulfur | 0.2% by weight. |
| Oxygen | 0.1% by weight. |
| Total unsaturates | 20% by volume. |

Of course, the first three named of these components will normally occur in chemical combination with hydrogen and carbon in petroleum base materials. However, if rapid cracking in zone B is properly inhibited, the rapid hydrogenation in zone A will not have an unduly deleterious effect on the operation. Therefore, zone A may, if desired, be operated using the same catalyst as used in zone C and with other conditions as they would be if the entire bed were being used in conventional fashion. However, it is preferable that conditions in zone A be adjusted to favor a higher cracking rate over a lower hydrogenation rate than in zone C. This may be accomplished by using a catalyst of higher cracking activity and lower hydrogenation activity than that used in zone C. Alternatively, a physical mixture of a cracking catalyst, such as the synthetic silica-alumina composite used in commercial catalytic cracking operations without hydrogen, and a hydrogenation catalyst, such as the conventional cobalt molybdate on alumina, in proper proportions may be used here.

Figure 4:
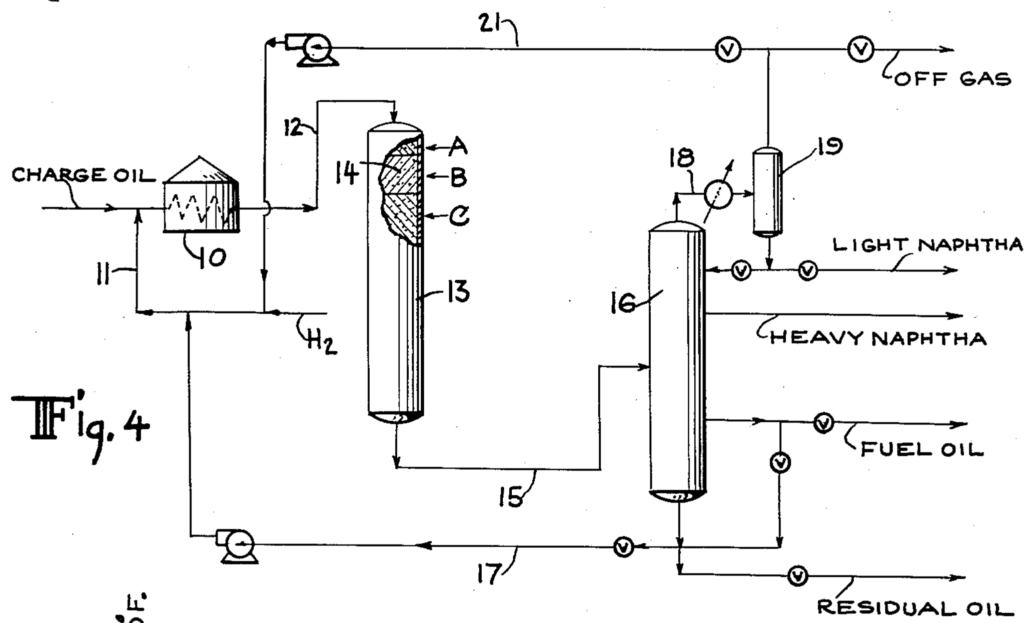
Figure 4 is a diagrammatic process flow sheet of a typical hydrocracking operation to which this invention might be employed.

Figure 4 illustrates the application of the foregoing to a typical hydrocracking process. A suitable charge oil, such as a heavy gas oil boiling above 800° F., is joined by hydrogen-containing gas admitted through line 11 and heated in furnace 10 to the desired reaction temperature, for example, 800° F. The heated mixture passes through line 12 into the upper end of reactor 13. Zones A, B and C, described above, are maintained within vessel 13 by suitably deep layers of differing catalysts forming a single reaction bed 14. Other reactors with similar reaction beds may be provided in parallel with reactor 13 for added capacity. The hydrocracked product leaves reactor 13 through line 15 and passes into fractionation column 16.

In fractionator 16 the hydrocracked product is divided into conventional fractions as indicated. Portions of the residual oil and the fuel oil may be recycled to the hydrocracking reactor through line 17. The gaseous material taken overhead through line 18 is passed to a gas separator 19 in which light naphtha is removed from the lighter gases. The lighter gases which are rich in hydrogen are returned to the system by means of line 21.

Figure 5:
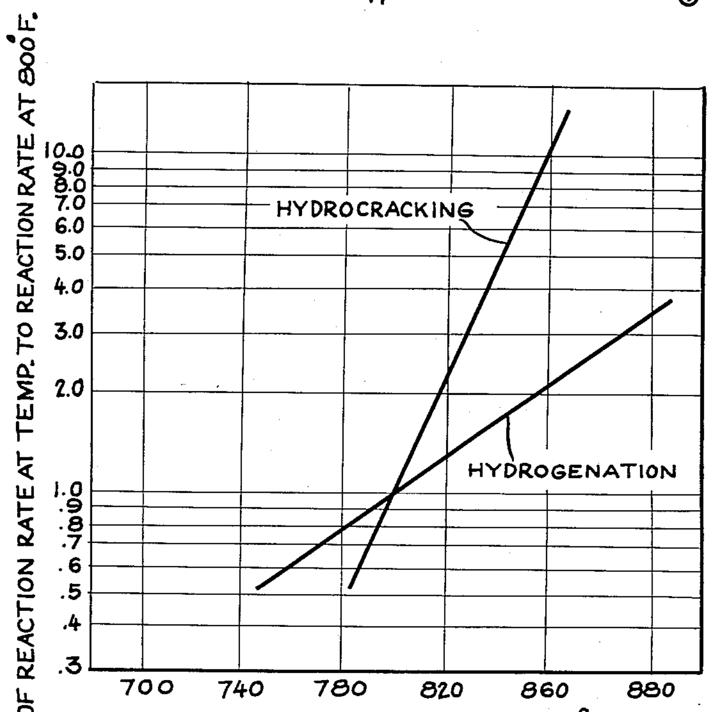
Figure 5 is a graph showing the variation in hydrogenation and cracking rates with temperature.

Figure 5 demonstrates the effect of temperature on the hydrogenation and cracking reactions in a hydrocracking operation. Against temperature there is plotted the ratio of the reaction rate at any given temperature to the reaction rate at 800° F. Figure 5 was determined from a plot of actual operating data. It is apparent that the cracking rate is much more sensitive to temperature than the hydrogenation rate. On Figure 5 the cracking rate may be cut in half by a temperature reduction of less than 20° F., while the hydrogenation rate is only halved with a 60° F. reduction.

Figure 5 indicates one further way in which this broad invention may be practiced. By cooling the effluent from zone A, a lower temperature in zone B will be maintained which will materially assist in maintaining the conditions in zone B relatively more favorable to hydrogenation and less favorable to cracking than in zone C. While both hydrogenation rate and cracking rate decrease with lower temperatures, the cracking rate decreases relatively more. The use of cooling in this fashion falls within the broad scope of this invention. It is specifically claimed in United States patent application Serial Number 767,924, filed October 17, 1958.

Figure 6:
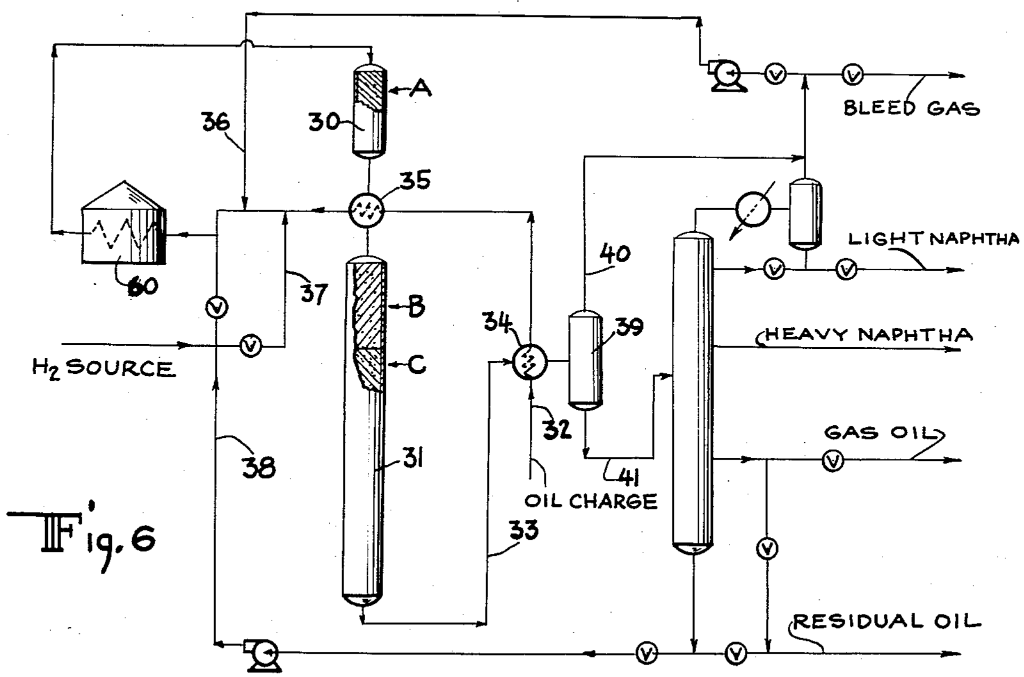
Figure 6 is a diagrammatic process flow sheet of another form of hydrocracking operation within the broad scope of this invention.

A specific application of the use of lower temperatures in zone B to reduce the tendency toward cracking and increase the tendency toward hydrogenation of the products that are cracked is illustrated in Figure 6. Zones A, B and C employ different catalysts as indicated above. In addition, zone A is contained in a separate vessel 30 from the vessel 31 which houses zones B and C. Cold charge oil in line 32 is heat exchanged with hot product from passage 33 in heat exchanger 34. Heated charge oil is then heat exchanged with the effluent from the vessel 30 in heat exchanger 35. The charge oil is blended with recycle hydrogen from line 36, any needed fresh hydrogen from line 37 and a recycle hydrocarbon stream from line 38, and passed through furnace 60, wherein the entire mixture is heated to the desired hydrocracking conversion temperature. The heated mixture is then fed to the upper end of zone A in vessel 30.

The heat exchange in 35 should reduce the zone A effluent in temperature to less than 790° F. The hydrocarbons then pass through zones B and C to complete the conversion. The zone A effluent should not be cooled below 740° F. in order to maintain reaction rates which are practical.

Heat exchange in exchanger 34 reduces the temperature of the product stream to a suitable temperature for separation and the gaseous material is then separated in a conventional high pressure separator 39. The gaseous material in line 40 and the liquid material in line 41 are then handled in the manner described in connection with Figure 4.

Figure 7:
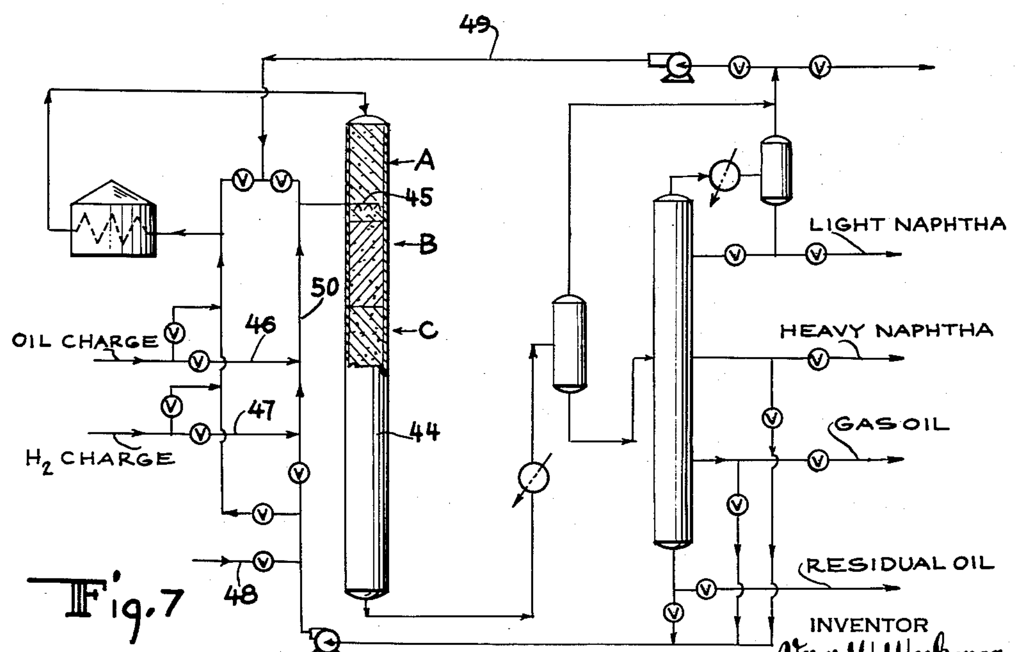
Figure 7 is a diagrammatic process flow sheet illustrating still another form of hydrocracking operation within the broad scope of this invention.

Figure 7 illustrates another way in which the temperature in zone B may be reduced. Reactor 44 is equipped with zones A, B and C having different catalysts and a liquid distributor 45 which may be of any conventional design, such as one or more perforated pipes. To this distributor 45 there is supplied a fluid which is cooler than the temperature of the reactants at that point in sufficient quantity to lower the temperature in zone B, as specified above, and thereby favor the hydrogenation reaction over the cracking reaction in that zone. The cooling fluid may include a part of the oil charge supplied through lines 46 and 50; it may include make-up hydrogen added through lines 47 and 50; it may include recycle gas supplied through lines 49 and 50; it may include any fraction of the total liquid reactor effluent. An entirely separate hydrocarbon stream may be used as a cooling fluid supplied through lines 48 and 50. This stream might consist of naphthenic (Tetralin type) oils so that the well-known donor diluent effect is obtained. Of course, any combination of the various cooling streams mentioned might be used.

The remainder of the operation disclosed in Figure 7 is the same as that shown in Figure 6.

As indicated above, any hydrocracking catalyst having both a hydrogenation component and a cracking component may be used in the main bulk of the reaction bed, zone C. As nonlimiting examples the catalyst may employ nickel, molybdenum, platinum, palladium, ruthenium, tungsten or cobalt or the oxides or sulfides of these materials deposited on an alumina, silica-alumina, silica zirconia or silica magnesia base. The catalyst in the other zones may have similar components to the catalyst in zone B, of course, having a higher ratio of hydrogenation activity to cracking activity than that in zone C in the preferred embodiments of this invention.

In zone A the catalyst may be the same as in zone C but preferably should have a lower ratio of hydrogenation activity to cracking activity. Within the broad scope of this invention zone A may even employ inert particles to crack immediately the easily cracked components in the feed at a place where coke laydown will not affect the operation. The catalyst in any of the zones, rather than being of one composition, may be a mechanical mixture or alternate layers of a hydrogenation catalyst and a cracking catalyst.

A particularly favored hydrocracking catalyst for use in connection with this invention is the catalyst described and claimed in United States patent application Serial Number 760,646, filed September 12, 1958. This catalyst comprises broadly, 15 to 40 percent weight silica, 3 to 20 percent weight molybdenum trioxide, 1 to 8 percent weight cobalt oxide and the remainder alumina.

As indicated above, zone C should comprise at least one-half of the residence time of the reactants and usually about two-thirds of the reaction time. Zones A and B will tend to require more residence time at higher space velocities. Thus, at space velocities of 0.1 to 1.0 liquid volume per volume of catalyst per hour, these two zones need only take up one-third of the bed or less; at higher space velocities, e.g., 1 to 2, they should be longer. Generally, zone B should have twice the residence time of zone A. Other factors which will have an effect on the required residence time in zones A and B are feed stock type, temperature, hydrogen to oil ratio and hydrogen consumption.

Another, less preferred, mode of operation which is within the broad scope of this invention is to operate zone B at a higher hydrogen partial pressure than zone C. This, too, will increase the relative hydrogenation to cracking reaction rate over conventional operations.

This invention has been described in connection with a three-zone reaction bed. This is particularly important where the concentrations of at least one of the following is present in the charge in at least the indicated quantity:

| | |
|---|---|
| Nitrogen | 0.05% by weight. |
| Sulfur | 0.2% by weight. |
| Oxygen | 0.1% by weight. |
| Total unsaturates | 20% by volume. |

Where none of these limits is exceeded the initial rapid hydrogenation may not occur and zone A may be eliminated. Thus, the reaction bed might consist of an initial zone of less than one-half of the total residence time, in which the catalyst has a higher ratio of hydrogenation activity to cracking activity than the catalyst in the remainder of the bed.

It is, of course, entirely possible to employ this invention in connection with a number of catalyst beds of the type described herein, which are arranged in parallel to obtain increased throughput.

The general range of operating conditions over which this invention will function are:

| | |
|---|---|
| Pressure | 500–10,000 pounds per square inch gauge. |
| Temperature | 700–1000° F. |
| Space velocity | 0.1–10 liquid volumes of reactant per volume of catalyst per hour. |
| Charge stocks | Petroleum or like hydrocarbon fractions boiling above 400° F. |

Of course, in the optimum operation of this invention the coke deposits in all zones build up at the same rate and to the same level while the unit is on stream. However, this optimum operation need not be achieved within the broad scope of this invention, since any reduction in the coke laydown on the catalyst initially encountered by reactants will be an improvement over the prior art.

*Example*

In a hydrocracking reaction in which 10,000 barrels per day of Mid-Continent heavy gas oil charge stock is converted, the reaction bed might be cylindrical and 8 feet in diameter and 54 feet deep. Three layers of catalyst, similar to those shown in Figure 4, might be employed in zones A, B and C. Zone A might be 7 feet deep and employ a catalyst which is a mechanical mixture of one part of a standard synthetic silica-alumina cracking catalyst to one part of standard hydrogenation catalyst made up of the oxides of cobalt and molybdenum on an alumina base. Zone B might be 11 feet deep and employ a catalyst of 0.5 percent platinum on a silica-alumina base. Zone C might be about 36 feet deep and employ a catalyst comprising 15 percent by weigth of silica, 2.5 percent by weight of cobalt oxide, 8 percent molybdenum oxide and 74.5 percent alumina.

This invention should be understood to include all of the changes and modifications of the examples of the invention, herein chosen for purposes of disclosure, which do not constitute departures from the spirit and scope of the invention.

I claim:

1. A process for the catalytic hydrocracking of a high boiling liquid hydrocarbon charge containing at least one of the following components in at least the quantity indicated: nitrogen 0.05 percent by weight, sulfur 0.2 percent by weight, oxygen 0.1 percent by weight, unsaturates 20 percent by volume, which comprises: maintaining three separate hydrocracking zones, each filled with a catalyst and arranged in series, the catalyst in the last zone in the series being greater in volume than the total volume of catalyst in the other two zones and having both hydrogenation and cracking activity, the catalyst in the second of said zones having a greater ratio of hydrogenation activity to cracking activity than the ratio of said activities of the catalyst in the last of said zones and the catalyst in the first of said zones having a ratio of hydrogenation activity to cracking activity less than the ratio of said activities in the second of said zones; passing the hydrocarbon charge through said zones in succession under hydrocracking reaction conditions which include a reaction temperature in each zone above 700° F., whereby uniform deposition of carbonaceous contaminant on all of the catalyst is promoted.

2. The process of claim 1 further limited to the catalyst in the first of said zones being the same as the catalyst in the last of said zones.

3. The process of claim 1 further limited to the catalyst in the first of said zones having a ratio of hydrogenation activity to cracking activity less than the ratio of said activities of the catalyst in the third of said zones.

4. A process for the catalytic hydrocracking of a hydrocarbon fraction boiling above 400° F. and containing at least one of the following components in at least the quantity indicated: nitrogen 0.05 weight percent, sulfur 0.2 weight percent, oxygen 0.1 weight percent, unsaturates 20 volume percent, which comprises: passing the hydrocarbon charge through a reaction zone containing a compact bed of particle form catalyst, said bed comprising at least two different catalysts arranged in three distinct layers between the inlet to said bed and the outlet therefrom through which the hydrocarbon fraction passes in succession, the volume of the layer adjacent the outlet of a size such that it comprises at least 50 percent of the total volume of catalyst in the reaction zone and the catalyst mass in the intermediate layer having a higher ratio of hydrogenation activity to cracking activity than the catalyst mass in the layer adjacent the outlet from said reaction zone while the catalyst mass in the layer adjacent the inlet to said reaction zone has a lower ratio of hydrogenation activity to cracking activity than the catalyst mass in the intermediate zone; maintaining the temperature throughout said reaction zone within the range 700 to 1000° F. and the pressure within the range 500 to 10,000 pounds per square inch gauge, whereby said hydrocarbon fraction is hydrocracked while uniform deposition of carbonaceous contaminant on the catalyst is promoted.

References Cited in the file of this patent

UNITED STATES PATENTS

| | | |
|---|---|---|
| 2,120,715 | Seguy | June 14, 1938 |
| 2,283,499 | Hachmuth | May 19, 1942 |
| 2,541,229 | Felming | Feb. 13, 1951 |
| 2,541,317 | Wilcon | Feb. 13, 1951 |
| 2,619,450 | Fleming | Nov. 25, 1952 |
| 2,706,705 | Oettinger et al. | Apr. 19, 1955 |
| 2,728,710 | Hendricks | Dec. 27, 1955 |